US012698987B2

(12) United States Patent
Ono

(10) Patent No.: US 12,698,987 B2
(45) Date of Patent: Aug. 4, 2026

(54) OPTICAL FIBER SENSING DEVICE AND METHOD

(71) Applicant: NTT, Inc., Tokyo (JP)

(72) Inventor: Shingo Ono, Musashino (JP)

(73) Assignee: NTT, Inc., Tokyo (JP)

( * ) Notice: Subject to any disclaimer, the term of this patent is extended or adjusted under 35 U.S.C. 154(b) by 360 days.

(21) Appl. No.: 18/685,823

(22) PCT Filed: Sep. 13, 2021

(86) PCT No.: PCT/JP2021/033491
§ 371 (c)(1),
(2) Date: Feb. 22, 2024

(87) PCT Pub. No.: WO2023/037535
PCT Pub. Date: Mar. 16, 2023

(65) Prior Publication Data
US 2026/0153365 A1     Jun. 4, 2026

(51) Int. Cl.
  *G01D 5/353*     (2006.01)
  *G01H 9/00*     (2006.01)
(52) U.S. Cl.
  CPC ..... *G01D 5/35396* (2013.01); *G01D 5/35306* (2013.01); *G01H 9/004* (2013.01)
(58) Field of Classification Search
  CPC ........... G01D 5/35396; G01D 5/35306; G01D 5/35383; G01H 9/004; G01B 9/02; G02B 6/00
  See application file for complete search history.

(56) References Cited

U.S. PATENT DOCUMENTS 4,699,513 A     10/1987  Brooks et al.
4,770,535 A *   9/1988  Kim ................... G01D 5/35383
                                                    250/227.27
(Continued)

FOREIGN PATENT DOCUMENTS

CN      107015310 B  *  6/2020  ......... G01B 9/02049
EP        0165671 B1 * 10/1990  ........... G02B 6/2821
(Continued)

OTHER PUBLICATIONS

J. L. Brooks, R. H. Wentworth, R. C. Youngquist, M. Tur, B. Y. Kim, and H. J. Shaw, "Coherence Multiplexing of Fiber-Optic Interferometric Sensors", J. Lightw. Technol., vol. LT-3, No. 5, pp. 1062-1072, 1985.

*Primary Examiner* — Abdullahi Nur
(74) *Attorney, Agent, or Firm* — Harness, Dickey & Pierce, PLC

(57)                  ABSTRACT
An optical fiber sensing device of the present disclosure includes: an optical fiber sensor system including a plurality of sensor units having different propagation delay times; a first light source for outputting an incident light to the optical fiber sensor system; a second light source for outputting a local light for combining with a transmitted light through the optical fiber sensor system; and a signal processing unit for detecting a change in an optical fiber using a received light signal I(t) obtained by combining the transmitted light and the local light, and, given that $\tau_i$ is an inter-optical-path propagation delay time difference at an i-th sensor unit of the sensor units, a change at the i-th sensor unit is derived using an autocorrelation between an optical intensity I(t) at the sensor unit and a signal $I(t+\tau_i)$ obtained by shifting the optical intensity I(t) by a time $\tau_i$.

6 Claims, 5 Drawing Sheets

[1]

AUTOCORRELATION FUNCTION $$R(\tau) = \int I(t)I(t+\tau)dt$$

(56)             References Cited

U.S. PATENT DOCUMENTS

| | | | | |
|---|---|---|---|---|
| 4,997,277 | A | * | 3/1991 | Horiguchi .............. G01M 11/39 |
| | | | | 356/73.1 |
| 5,642,196 | A | | 6/1997 | Alves et al. |
| 2009/0290147 | A1 | * | 11/2009 | MacDougall ...... G01D 5/35383 |
| | | | | 356/477 |
| 2019/0331508 | A1 | * | 10/2019 | Gruca ................ G01D 5/35316 |

FOREIGN PATENT DOCUMENTS

| | | | | | |
|---|---|---|---|---|---|
| JP | S61210910 | A | | 9/1986 | |
| JP | H026725 | A | | 1/1990 | |
| JP | H09119814 | A | | 5/1997 | |
| WO | WO-2017026896 | A1 | * | 2/2017 | ......... G01D 5/35325 |
| WO | WO-2020071914 | A1 | * | 4/2020 | ......... G01D 5/35329 |

* cited by examiner

[2]

[4]

OPTICAL FIBER SENSING DEVICE AND METHOD

CROSS-REFERENCE TO RELATED APPLICATIONS

This application is a 371 U.S. National Phase of International Application No. PCT/JP2021/033491, filed on Sep. 13, 2021. The entire disclosure of the above application is incorporated herein by reference.

TECHNICAL FIELD

The present disclosure relates to a field of optical fiber sensing technologies.

BACKGROUND ART

An optical fiber sensor is a generic term for a system and a measurement technique for sensing a change in physical quantities, such as temperature and distortion in association, in association with a change in optical intensity, frequency, or phase using an optical fiber as a sensor medium. One of the optical fiber sensors is an interferometric type optical fiber sensor. The interferometric type optical fiber sensor uses one of optical paths in a Mach Zehnder interferometer as a sensor unit, and performs sensing using a phenomenon in which the intensity of an interference signal varies by the change in the optical path length of the sensor unit due to the temperature or the distortion.

In addition, a multi-point interferometric type optical fiber sensor, where connects a plurality of interferometric type optical fiber sensors are connected to separate and detect signals of individual sensors, has also been developed. Multiplexing methods of the multi-point interferometric type optical fiber sensor include time domain division multiplexing, wavelength domain division multiplexing, and coherence domain division multiplexing, whose differences depend on a division multiplexing method of a plurality of sensor signals. In particular, the coherence domain division multiplexing has an advantage that each sensor signal can be constantly monitored and an increase in a number of sensor points can be achieved without using a special optical device such as a wavelength division optical coupler.

An outline of the multi-point interferometric type optical fiber sensor based on the coherence domain division multiplexing is described in Non Patent Literature 1. Specifically, a continuous light is input to the sensor units to which a plurality of Mach Zehnder interferometers are connected, a transmitted light is optically divided, and signals are separated and detected by the Mach Zehnder interferometers for light reception corresponding to the individual sensor units. In this regard, inter-optical-path propagation delay time differences at the plurality of interferometers used in the sensor unit are designed to be different from each other, and the inter-optical-path propagation delay time difference at the interferometer for light reception is designed to be equal to the inter-optical-path propagation delay time difference at the interferometer of the corresponding sensor unit.

Given that N is the number of sensor units (N is a natural number), $E_0(t)$ is a complex electric-field amplitude of the continuous light emitted from a low coherence light source, and $E_i(t)$ is a complex electric-field amplitude of the transmitted light through the i-th sensor unit (i=1 to N), a time average of optical intensity $\langle I_j(t) \rangle$ detected by a j-th optical receiver (j=1 to N) is expressed by a following formula.

[Math. 1]

$$\langle I_j(t) \rangle \propto \int \left| E_0(t) + E_0(t - \tau_j) + \sum_{i=1}^{N} [E_i(t) + E_i(t - \tau_j)] \right|^2 dt \tag{1}$$

Here, $\tau_j$ is an inter-optical-path propagation delay time difference at the interferometer of the j-th optical receiver. Given that $\tau_i$ and $\Delta\theta_i$ are optical phase changes due to the change in the propagation delay time at the i-th sensor unit and the change in the temperature or the distortion, respectively, $E_i(t)$ and $\langle I_j(t) \rangle$ can be expressed by the following formulae, respectively.

[Math. 2]

$$E_i(t) = e^{j\Delta\theta_i} a_i E_0(t - \tau_i) \tag{2}$$

[Math. 3]

$$\langle I_j(t) \rangle \propto$$

$$\int \left| E_0(t) + E_0(t - \tau_j) + \sum_{i=1}^{N} e^{j\Delta\theta_i} a_i [E_0(t - \tau_i) + E_0(t - \tau_i - \tau_j)] \right|^2 dt \propto$$

$$2 \left( \sum_{i=1}^{N} a_i + 1 \right) \Gamma(0) + \Gamma(\tau_j) + \sum_{i=1}^{N} a_i [2\Gamma(\tau_i) + \Gamma(\tau_i - \tau_j) + \Gamma(\tau_i + \tau_j)] \cos \Delta\theta_i \tag{3}$$

Here, $a_i$ is a coefficient of an optical amplitude of the light passing through the i-th sensor unit.

$\Gamma(\tau)$ is an autocorrelation function of $E_0(t)$ and is defined by the following formula.

[Math. 4]

$$\Gamma(\tau) \equiv \frac{1}{\sqrt{\int |E_0(t)|^2 dt} \sqrt{\int |E_0(t + \tau)|^2 dt}} \int E_0(t) E_0^*(t + \tau) dt \tag{4}$$

Here, the suffix * represents a complex conjugate.

When a coherence time of $E_0(t)$ is sufficiently shorter than a possible value of $\tau$, $\Gamma(\tau)$ can be assumed as the following formula.

[Math. 5]

$$\Gamma(\tau) = \begin{cases} 1 & (\tau = 0) \\ 0 & (\tau \neq 0) \end{cases} \tag{5}$$

Given that Formula (5) is substituted into Formula (3), $\langle I_j(t) \rangle$ is expressed by the following formula in the region of $\tau > 0$.

[Math. 6]

$$\langle I_j(t) \rangle \propto \begin{cases} 2 \left( \sum_{i=1}^{N} a_i + 1 \right) \Gamma(0) + a_i \cos \Delta\theta_j (\tau_j = \tau_i) \\ 2 \left( \sum_{i=1}^{N} a_i + 1 \right) \Gamma(0) \, (\tau_j \neq \tau_i) \end{cases} \tag{6}$$

Therefore, the time average $\langle I_j(t) \rangle$ of the optical intensity detected by the j-th optical receiver varies depending only

3 on the optical phase change $\Delta\theta_j$ at the sensor unit where the propagation delay time difference matches that at the interferometer. That is, the signals of the individual sensor units can be separated and detected for each optical receiver. $\Delta\theta_j$ has a relationship with the temperature change $\Delta T_j$ and the distortion change $\Delta\varepsilon_j$ at the j-th sensor unit described in the following formula.

[Math. 7]

$$\Delta\theta_j = C_T \Delta T_j + C_\varepsilon \Delta\varepsilon_j \qquad (7)$$

Here, $C_T$ and $C_\varepsilon$ are proportional constants of the temperature change and the distortion change, respectively. By deriving the proportional constant $C_T$ or $C_\varepsilon$ in advance and substituting Formula (7) into Formula (6), the change in the temperature or the distortion in the corresponding sensor unit can be measured.

CITATION LIST

Non Patent Literature

Non Patent Literature 1: J. L. Brooks, R. H. Wentworth, R. C. Youngquist, M. Tur, B. Y. Kim, and H. J. Shaw, "Coherence Multiplexing of Fiber-Optic Interferometric Sensors", J. Lightw. Technol., Vol. LT-3, No. 5, pp. 1062-1072, 1985.

SUMMARY OF INVENTION

Technical Problem

In the conventional multi-point interferometric type optical fiber sensor based on the coherence domain division multiplexing, since it is necessary to prepare the Mach Zehnder interferometers and the optical receivers for the light receiving units that are as many as the sensor units each, there are problems that a device configuration becomes complicated and costly as the number of sensor units increases. In addition, it is necessary to design such that the inter-optical-path propagation delay time difference at the interferometer prepared in the light receiving unit matches the inter-optical-path propagation delay time difference at the interferometer of the corresponding sensor unit, and this is not necessarily so easy.

The present disclosure has been made in view of the above problems, and an object of the present disclosure is to provide a technology that enables increase in the number of sensor points without complicating the configuration and the design of the device in the multi-point interferometric type optical fiber sensor based on the coherence domain division multiplexing.

Solution to Problem

An optical fiber sensing device according to the present disclosure includes: an optical fiber sensor system including a plurality of sensor units having different propagation delay times; a first light source for outputting an incident light to the optical fiber sensor system; a second light source for outputting a local light for combining with a transmitted light through the optical fiber sensor system; and a signal processing unit for detecting a change in an optical fiber using a received light signal I(t) obtained by combining the transmitted light and the local light, and, given that $\tau_i$ is an inter-optical-path propagation delay time difference at an i-th sensor unit of the sensor units, the change at the i-th sensor unit is derived using an autocorrelation between an optical intensity I(t) at the sensor unit and a signal I(t+$\tau_i$) obtained by shifting the optical intensity I(t) by a time $\tau_i$.

A method for optical fiber sensing according to the present disclosure includes the steps of: inputting an incident light from a first light source to an optical fiber sensor system including a plurality of sensor units having different propagation delay times; combining a local light from a second light source with a transmitted light through the optical fiber sensor system; and detecting a change in the optical fiber by the signal processing unit using a received light signal I(t) obtained by combining the transmitted light and the local light, and, given that $\tau_i$ is an inter-optical-path propagation delay time difference at an i-th sensor unit of the sensor units, a change at the i-th sensor unit is derived using an autocorrelation between an optical intensity I(t) at the sensor unit and a signal I(t+$\tau_i$) obtained by shifting the optical intensity I(t) by a time $\tau_i$.

Advantageous Effects of Invention

According to the present disclosure, since a number of sensor units can be increased without using interferometers on light reception sides, a multipoint sensing can be realized with a single device configuration regardless of the number of sensor units. Therefore, the present disclosure enables increase in the number of sensor points without complicating a configuration and design of the device in a multi-point interferometric type optical fiber sensor based on coherence domain division multiplexing.

DESCRIPTION OF EMBODIMENTS

Figure 1:
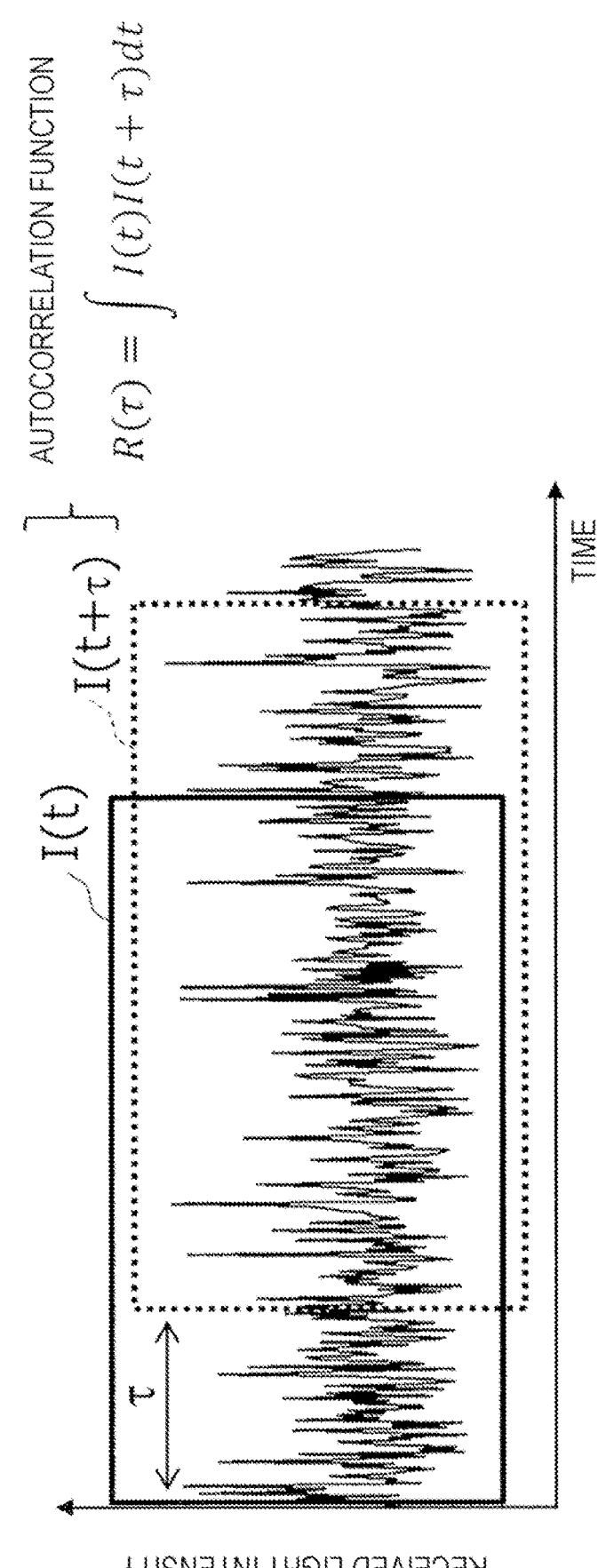
FIG. 1 is a conceptual diagram of a method for calculating an autocorrelation function in the present disclosure.

The following is a detailed description of embodiments of the present disclosure, with reference to the drawings. Note that the present disclosure is not limited to the embodiments described below. These embodiments are merely examples, and the present disclosure can be carried out in forms with various modifications and improvements based on the knowledge of those skilled in the art. Note that components denoted by the same reference sign in the description and the drawings are the same.

An optical fiber sensing device of the present disclosure is the optical fiber sensing device that detects a change in an optical fiber by using two types of light sources: a first light source inputting a continuous light output therefrom into the optical fiber, and a second light source outputting a local light therefrom for combining with a transmitted light through the optical fiber. The optical fiber is an optical fiber sensor system including a plurality of sensor units having different propagation delay times.

The optical fiber sensing device of the present disclosure includes: a first light source outputting an incident light to the optical fiber sensor system; a second light source outputting the local light for combining with the transmitted light through the optical fiber sensor system; and an optical receiver receiving a combined light of the transmitted light and the local light. The incident light and the local light are both continuous lights. The optical fiber sensing device of the present disclosure transmits the incident light being output from the first light source through the optical fiber sensor system, and measures an optical intensity of the combined light obtained by combining the transmitted light through the optical fiber sensor system and the local light.

In the present disclosure, signals of individual sensor units are separated and detected such that the transmitted light transmitted through a plurality of sensor units is combined with the local light, a coherent detection for the combined light is collectively performed by a single optical receiver, and a digital autocorrelation processing is performed for the signals obtained by the coherent detection.

Given that $E_{lo}(t)$ is the complex electric-field amplitude of the local light, a signal $I(t)$ obtained by the coherent detection is expressed by the following formula.

[Math. 8]

$$I(t) = \left| E_0(t) + \sum_{i=1}^{N} e^{j\Delta\theta_i} a_i E_0(t - \tau_i) + E_{lo}(t) \right|^2 \propto I_0(t) + \sum_{i=1}^{N} I_i(t) \tag{8}$$

Here, $E_0$ is the complex electric-field amplitude of the incident light, $\Delta\theta_i$ is an optical phase change at the i-th sensor unit, $a_i$ is a coefficient of the optical amplitude passing through the i-th sensor unit, $\tau_i$ is a propagation delay time at the i-th sensor unit, $I_0(t)$ is the optical intensity of the incident light, and $I_i(t)$ is the optical intensity of the combined light of the transmitted light at the i-th sensor unit and the local light.

Here, it is assumed that the local light intensity is sufficiently higher than the transmitted light intensity of each sensor unit and interference components between the transmitted lights through the sensor units are negligible, and $I_0(t)$ and $I_i(t)$ are defined as follows.

[Math. 9]

$$I_0(t) \equiv E_0(t)E^*_{lo}(t) + E^*_0(t)E_{lo}(t) \tag{9}$$

[Math. 10]

$$I_i(t) \equiv e^{j\Delta\theta_i} a_i E_0(t - \tau_i)E^*_{lo}(t) + \left[ e^{j\Delta\theta_i} a_i E_0(t - \tau_i) \right]^* E_{lo}(t) \tag{10}$$

Next, an autocorrelation function $R(\tau)$ of $I(t)$ is calculated. FIG. 1 illustrates a calculation image of $R(\tau)$. $R(\tau)$ calculates a time integral of a product of $I(t)$ and a waveform $I(t+\tau)$, obtained by shifting $I(t)$ by a certain time $\tau$, as a function of $\tau$. $R(\tau)$ can be calculated by a digital signal processing according to the following formula.

[Math. 11]

$$\tag{11}$$

-continued $$R(\tau) = \int I(t)I(t + \tau)dt = \tag{11}$$

$$\int I_0(t)I_0(t + \tau)dt + \sum_{i=1}^{N} \int [I_0(t)I_i(t + \tau) + I_0(t + \tau)I_i(t)]dt$$

Here, it is assumed that $I_i(t)$ is sufficiently lower ($a_i \ll 1$) than $I_0(t)$, and $I_i(t)$ $I(t)$ (i and j can be any natural numbers from 1 to N and $i \neq j$) is negligible. A first term of Formula (11) is calculated by the following formula.

[Math. 12]

$$\int I_0(t)I_0(t + \tau)dt = \int [E_0(t)E^*_{lo}(t) + E^*_0(t)E_{lo}(t)] \tag{12}$$

$$[E_0(t + \tau)E^*_{lo}(t + \tau) + E^*_0(t + \tau)E_{lo}(t + \tau)]dt =$$

$$\int E_0(t)E^*_0(t + \tau) + E^*_{lo}(t)E_{lo}(t + \tau)dt + c.c.$$

Here, c.c. represents a complex conjugate.

When the coherence time of the local light is sufficiently long with respect to a possible value of $\tau$, $E^*_{lo}(t)E_{lo}(t+\tau)$ and its complex conjugate can be assumed as a constant that does not depend on t. Furthermore, by applying Formulae (4) and (5), Formula (12) is expressed as the following formula.

[Math. 13]

$$\int I_0(t)I_0(t + \tau)dt \propto \Gamma(\tau) = \begin{cases} 1 & (\tau = 0) \\ 0 & (\tau \neq 0) \end{cases} \tag{13}$$

Similarly, a second term of Formula (11) is calculated by the following formula.

[Math. 14]

$$\int [I_0(t)I_i(t + \tau) + I_0(t + \tau)I_i(t)]dt = \int [E_0(t)E^*_{lo}(t) + E^*_0(t)E_{lo}(t)] \tag{14}$$

$$\left\{ e^{j\Delta\theta_i} a_i E_0(t + \tau - \tau_i)E^*_{lo}(t + \tau) + \left[ e^{j\Delta\theta_i} a_i E_0(t + \tau - \tau_i) \right]^* E_{lo}(t + \tau) \right\} dt +$$

$$\int [E_0(t + \tau)E^*_{lo}(t + \tau) + E^*_0(t + \tau)E_{lo}(t + \tau)]$$

$$\left\{ \left[ e^{j\Delta\theta_i} a_i E_0(t - \tau_i) \right]E_{lo}(t) + \left[ e^{j\Delta\theta_i} a_i E_0(t - \tau_i) \right]^* E_{lo}(t) \right\} dt \propto$$

$$e^{-j\Delta\theta_i} a_i \Gamma(\tau - \tau_i) + e^{-j\Delta\theta_i} a_i \Gamma(\tau + \tau_i) + c.c. \propto$$

$$a_i[\Gamma(\tau - \tau_i) + \Gamma(\tau + \tau_i)]\cos \Delta\theta_i = \begin{cases} a_i \cos\Delta\theta_i & (\tau = \pm\tau_i) \\ 0 & (\tau \neq \pm\tau_i) \end{cases}$$

Figure 2:
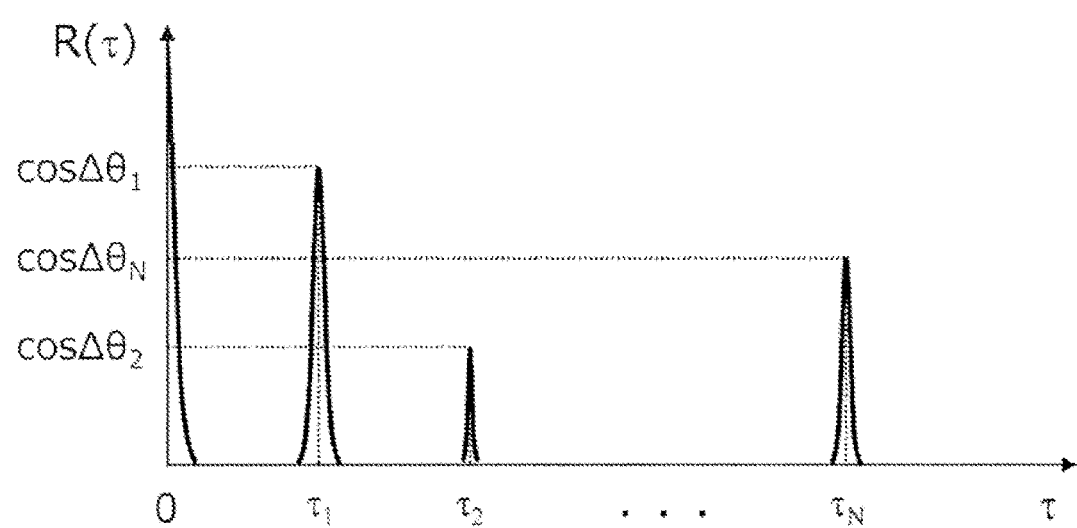
FIG. 2 is a conceptual diagram of a calculation result of an autocorrelation function in the present disclosure.

A waveform image of $R(\tau)$ calculated as described above is illustrated in FIG. 2. $R(\tau)$ has peaks at positions of $\tau=0$, $\tau_1, \ldots \tau_N$, and a peak intensity at $\tau=\tau_i$ is proportional to cos $\Delta\theta_i$. That is, each peak intensity of $R(\tau)$ varies in response to the change in the temperature or the distortion of each sensor unit. Since $\Delta\theta_i$ has a relationship with the change in the temperature or the distortion of the i-th sensor unit as expressed by Formula (7), it is feasible to measure each peak intensity change in $R(\tau)$ in association with the change in the temperature or the distortion of each sensor unit by deriving proportional constants $C_T$ and $C_\varepsilon$, with respect to the change in the temperature or the distortion, in advance.

Therefore, given that an inter-optical-path propagation delay time difference at the i-th sensor unit is $\tau_i$, the optical fiber sensing device of the present disclosure derives the change at the i-th sensor unit by using the autocorrelation function $R(\tau)$ between the optical intensity $I(t)$ at the sensor unit and the signal $I(t+\tau_i)$ obtained by shifting the optical intensity $I(t)$ by the time $\tau_i$.

According to the present disclosure, it is practical to increase the number of sensor units without adding interferometers or the optical receivers of the light receiving unit in a multi-point interferometric type optical fiber sensor. In addition, it is necessary to design the interferometer of the sensor unit and the interferometer of the light receiving unit so that their inter-optical-path propagation delay time differences are equal in the conventional art, whereas the interferometer in the light receiving unit is not needed in the present disclosure, which can simplify the design of the light receiving unit. As a result, since multipoint sensing can be realized with a single device configuration regardless of the number of sensor units, the optical fiber sensing with lower cost and higher expandability than before can be achieved. Hereinafter, the embodiments of the present disclosure will be described with reference to the accompanying drawings. Here, two embodiments having different configurations of the sensor units will be described.

Embodiment 1

Figure 3:
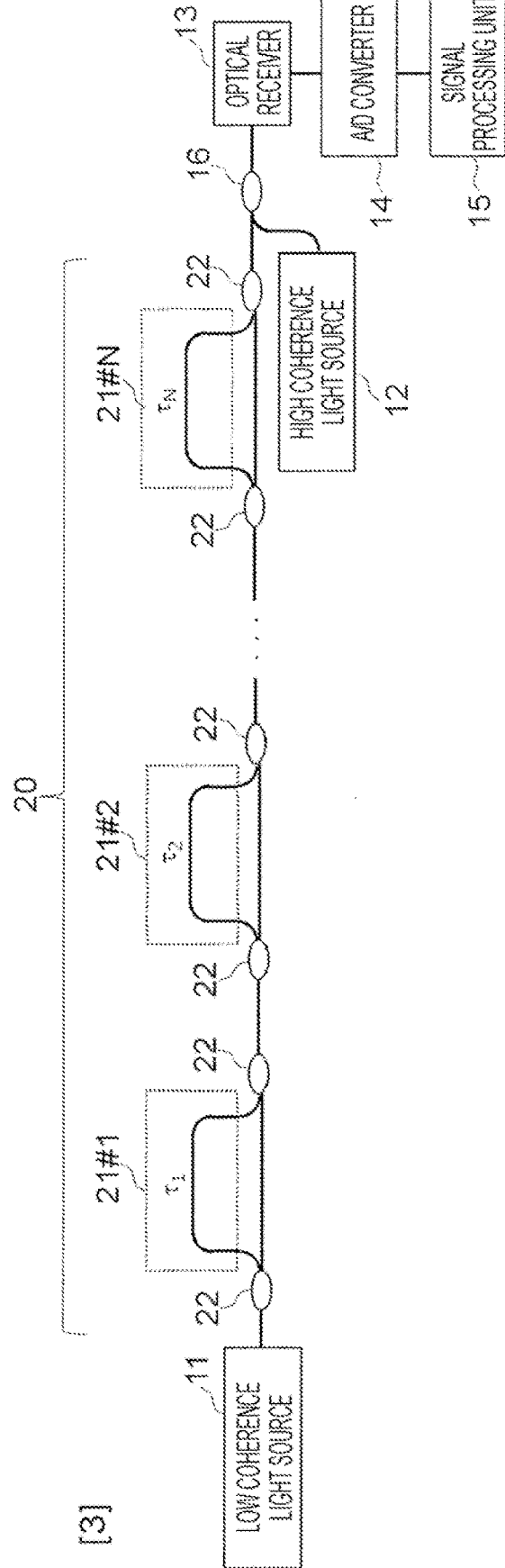
FIG. 3 is a block diagram illustrating a device configuration according to a first embodiment of the present disclosure.

FIG. 3 is a block diagram illustrating a device configuration according to the present embodiment. A low coherence light source 11 is used as a first light source, and a high coherence light source 12 is used as a second light source. The high coherence light source 12 functions as a local light source outputting a local light. The local light of the present disclosure uses a high coherence light having a coherence time longer than that of a low coherence light from the low coherence light source 11 and a coherence time longer than a light propagation delay time at a certain sensor unit 21. An optical fiber sensor system 20 has a chain type configuration in which a plurality of Mach Zehnder interferometers 21 are connected, in series, with optical couplers 22, and one of optical paths in each Mach Zehnder interferometer is a sensor unit 21 unilaterally.

A continuous light from the low coherence light source 11 is input to the optical fiber sensor system 20, and the low coherence light after transmission through the chain-type optical fiber sensor system 20 is combined with the high coherence light from the high coherence light source 12 at an optical coupler 16, and converted into an analog electric signal by an optical receiver 13. A received light signal that is the electrical signal, obtained by the conversion, is converted into a digital signal by an analog to digital (A/D) converter 14 and transferred to a signal processing unit 15. The signal processing unit 15 calculates an autocorrelation function $R(\tau)$ in accordance with Formula (11) using the received light signal I(t) that is the digital signal, obtained by the conversion.

$R(\tau)$ has peaks at positions $\tau=0$, $\tau_1$, . . . $\tau_N$, and when a change in temperature or distortion of the sensor unit 21 #$i$ (i can be any integer of 1 to N) in FIG. 3 is observed, the change in a peak intensity at $\tau=\tau_i$ is monitored. By applying a relationship of Formula (7) regarding the peak intensity change cos $\Delta\theta_i$, the change in the temperature or the distortion in the sensor unit 21 #$i$ is measured.

Note that optical fibers having different fiber lengths are used for each sensor unit 21 #$i$ in the present embodiment, and a minimum value of the propagation delay time difference $|\tau_j-\tau_i|$ (j≠i) between the sensor units is designed to be longer than the coherence time of the low coherence light source 11, and a maximum value max$\{\tau_1, \tau_2, . . . \tau_N\}$ of the propagation delay time $\tau_j$ at the sensor unit 21 #$i$ is designed to be shorter than the coherence time of the high coherence light source 12.

Embodiment 2

Figure 4:
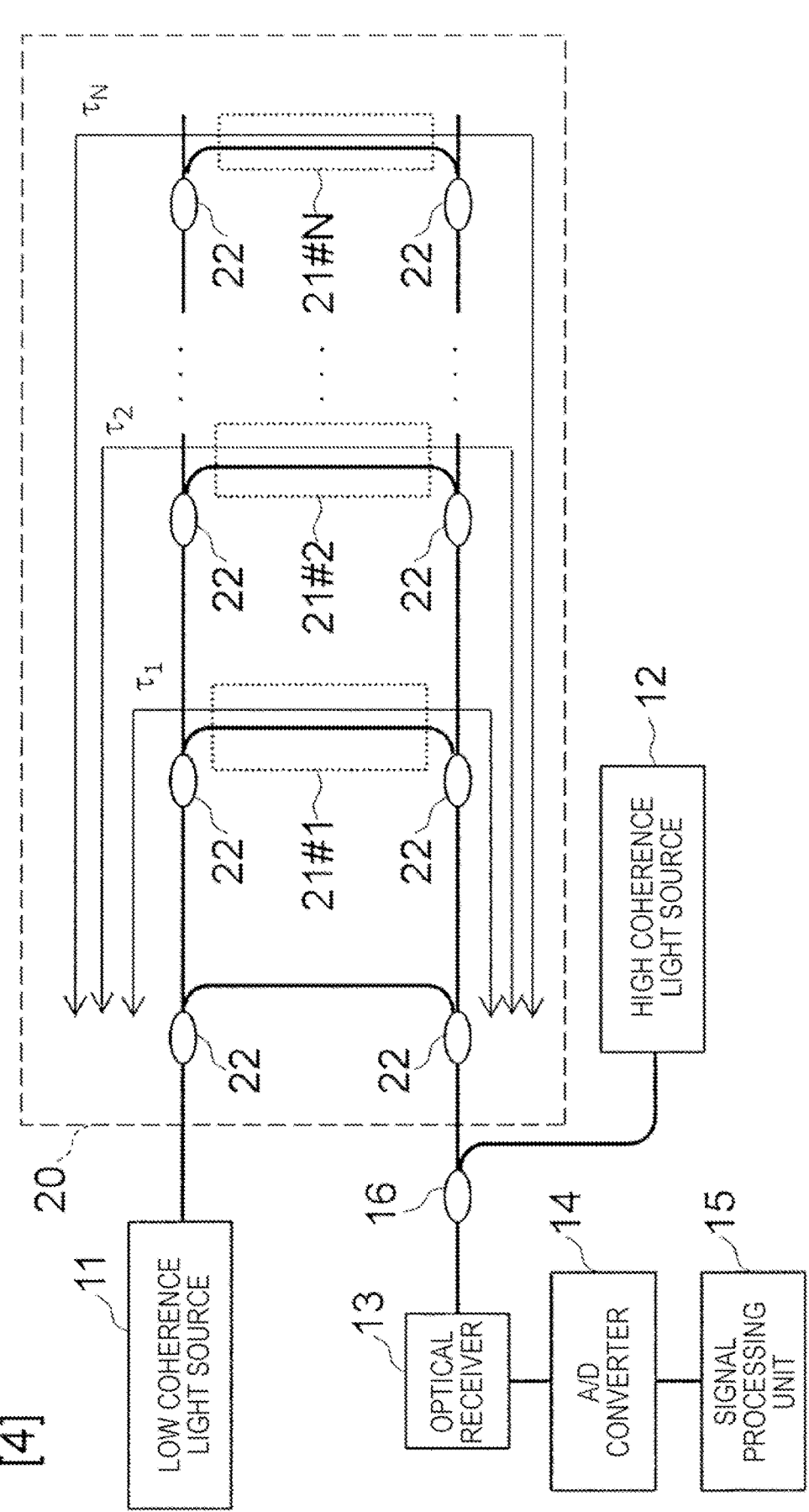
FIG. 4 is a block diagram illustrating a device configuration according to a second embodiment of the present disclosure.

FIG. 4 is a block diagram illustrating a device configuration according to the present embodiment. A low coherence light source 11 is used as a first light source, and a high coherence light source 12 is used as a second light source. The high coherence light source 12 functions as a local light source outputting a local light. An optical fiber sensor system 20 includes a plurality of sensor units 21 connected in parallel, and a propagation delay time $\tau$ of a coherence light transmitted through the optical fiber sensor system 20 is different for each sensor unit 21. In the present embodiment, the optical fiber sensor system 20 has a configuration in which optical fibers are connected, in a ladder type, with optical couplers 22 and optical path of each step of the ladder is the sensor unit 21 #$i$.

A continuous light from the low coherence light source 11 is input to the optical fiber sensor system 20, and the continuous light after transmission through the ladder-type optical fiber sensor system 20 is combined with the local light from the high coherence light source 12 at an optical coupler 16 and converted into an electric signal by an optical receiver 13. A received light signal that is the electrical signal, obtained by the conversion, is converted into a digital signal by an analog to digital (A/D) converter 14 and transferred to a signal processing unit 15. The signal processing unit 15 calculates an autocorrelation function $R(\tau)$ in accordance with Formula (11) using the received light signal I(t) that is the digital signal, obtained by the conversion.

$R(\tau)$ has peaks at positions $\tau=0$, $\tau_1$, . . . $\tau_N$, and when a change in temperature or distortion of the sensor unit 21 #$i$ (i can be any integer of 1 to N) in FIG. 4 is observed, the change in a peak intensity at $\tau=\tau_i$ is monitored. By applying a relationship of Formula (7) regarding the peak intensity change cos $\Delta\theta_i$, the change in the temperature or the distortion in the sensor unit 21 #$i$ is measured.

Figure 5:
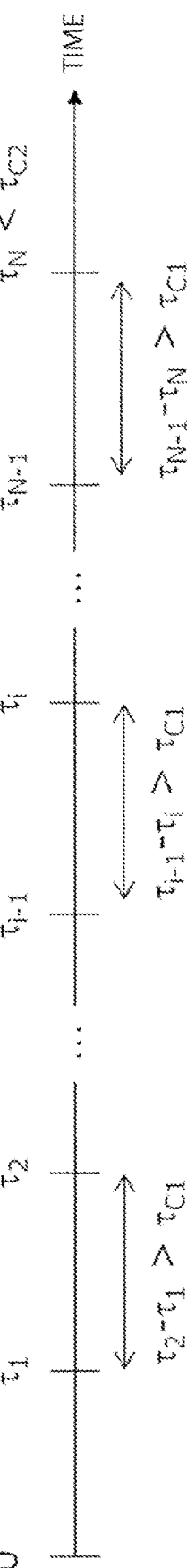
FIG. 5 illustrates an example of a relationship between a coherence time and a propagation delay time in a sensor unit.

FIG. 5 illustrates an example of the relationship between a coherence time and the propagation delay time at the sensor unit. Given that $\tau_{C1}$ is the coherence time of the incident light and $\tau_{C2}$ is the coherence time of the local light, the optical fiber sensor system 20 in the present embodiment is designed such that a minimum value of a propagation delay time difference $|\tau_j-\tau_i|$ (j≠i) between optical paths passing through each sensor unit 21 #$i$ is longer than the coherence time $\tau_{C1}$ of the low coherence light source 11, and a maximum value max$\{\tau_1, \tau_2, . . . \tau_N\}$ of the propagation delay time of the optical path passing through each sensor unit 21 #$i$ is shorter than the coherence time $\tau_{C2}$ of the high coherence light source 12.

The signal processing unit 15 of the present disclosure can also be configured using a computer and a program, and the program can be recorded on a recording medium or delivered through a network.

INDUSTRIAL APPLICABILITY

The present disclosure can be applied to an information and communication industry.

REFERENCE SIGNS LIST

11 Low coherence light source
12 High coherence light source
13 Optical receiver
14 A/D converter
15 Signal processing unit
16, 22 Optical coupler

20 Optical fiber sensor system
21 Mach Zehnder interferometer
The invention claimed is:

1. An optical fiber sensing device comprising:
an optical fiber sensor system including a plurality of sensor units having different propagation delay times;
a first light source for outputting an incident light to the optical fiber sensor system;
a second light source for outputting a local light for combining with a transmitted light through the optical fiber sensor system; and
a signal processing unit for detecting a change in an optical fiber using a received light signal $I(t)$ obtained by combining the transmitted light and the local light,
wherein, given that $\tau_i$ is an inter-optical-path propagation delay time difference at an i-th sensor unit of the sensor units, a change at the i-th sensor unit is derived by the signal processing unit using an autocorrelation between an optical intensity $I(t)$ at the sensor unit and a signal $I(t+\tau_i)$ obtained by shifting the optical intensity $I(t)$ by a time $\tau_i$.

2. The optical fiber sensing device according to claim 1, wherein the propagation delay time $\tau_i$ of the incident light passing through the i-th sensor unit is shorter than a coherence time of the local light, and a propagation delay time difference $|\tau_i - \tau_j|$ compared with the propagation delay time $\tau_j$ of the incident light passing through the j-th sensor unit of the sensor units (j is a natural number except i) is longer than a coherence time of the incident light.

3. The optical fiber sensing device according to claim 1, wherein the optical fiber sensor system comprises a plurality of Mach Zehnder interferometers connected with each other in series, the sensor units are unilateral optical paths in the Mach Zehnder interferometers, and the inter-optical-path propagation delay time differences $\tau$ at the sensor units implemented in the plurality of Mach Zehnder interferometers are different from each other.

4. The optical fiber sensing device according to claim 1, wherein the optical fiber sensor system comprises the plurality of sensor units connected with each other in parallel, and the propagation delay time T of the incident light passing through the optical fiber sensor system is different for each sensor unit.

5. The optical fiber sensing device according to claim 1, wherein the change at the sensor unit is a change in temperature or distortion at the i-th sensor unit.

6. A method for optical fiber sensing, comprising the steps of:
inputting an incident light from a first light source to an optical fiber sensor system including a plurality of sensor units having different propagation delay times;
combining a local light from a second light source with a transmitted light through the optical fiber sensor system; and
detecting a change in an optical fiber by a signal processing unit using a received light signal $I(t)$ obtained by combining the transmitted light and the local light,
wherein, given that $\tau_i$ is an inter-optical-path propagation delay time difference at an i-th sensor unit of the sensor units, a change at the i-th sensor unit is derived by the signal processing unit using an autocorrelation between an optical intensity $I(t)$ at the sensor unit and a signal $I(t+\tau_i)$ obtained by shifting the optical intensity $I(t)$ by a time $\tau_i$.

\* \* \* \* \*